(12) United States Patent
Kipping et al.

(10) Patent No.: US 6,525,294 B1
(45) Date of Patent: Feb. 25, 2003

(54) DEVICE FOR CLAMPING AND WELDING PIECES OF SHEET METAL

(75) Inventors: Josef Kipping, Schmelz (DE); Josef Görgen, Weiskirchen (DE)

(73) Assignee: Thyssenkrupp Technologies AG (DE)

( * ) Notice: Subject to any disclaimer, the term of this patent is extended or adjusted under 35 U.S.C. 154(b) by 0 days.

(21) Appl. No.: 09/889,122

(22) PCT Filed: Jan. 4, 2000

(86) PCT No.: PCT/EP00/00023
§ 371 (c)(1),
(2), (4) Date: Oct. 27, 2001

(87) PCT Pub. No.: WO00/41840
PCT Pub. Date: Jul. 20, 2000

(30) Foreign Application Priority Data

Jan. 11, 1999 (DE) .......................................... 199 00 699

(51) Int. Cl.[7] .............................................. B21J 13/08
(52) U.S. Cl. ................................... 219/121.63; 219/161
(58) Field of Search ................ 219/121.63, 121.64, 219/121.67, 121.68, 121.69, 121.82, 161, 158; 269/249

(56) References Cited

U.S. PATENT DOCUMENTS

| 4,472,055 A | * | 9/1984 | Tsutsumi | 356/624 |
|---|---|---|---|---|
| 4,533,814 A | * | 8/1985 | Ward | 219/121.64 |
| 5,225,650 A | * | 7/1993 | Babel et al. | 219/121.69 |
| 5,324,913 A | * | 6/1994 | Oberg et al. | 219/121.63 |
| 5,430,547 A | * | 7/1995 | Takagi et al. | 356/614 |
| 5,478,983 A | | 12/1995 | Rancourt | |
| 5,841,098 A | * | 11/1998 | Gedrat et al. | 219/121.63 |

FOREIGN PATENT DOCUMENTS

| EP | 0 734 304 B1 | 6/1997 |
|---|---|---|
| JP | 06 234089 A | 8/1994 |

* cited by examiner

*Primary Examiner*—Tom Dunn
*Assistant Examiner*—Jonathan Johnson
(74) *Attorney, Agent, or Firm*—McGlew and Tuttle, P.C.

(57) ABSTRACT

The invention relates to a device for clamping and welding pieces of sheet metal (13, 14) which are placed against one another, preferably for use in the area of automobile manufacturing. According to the invention, a bracket (3) is fastened to a mounting flange (1), preferably of a robot arm. Said bracket (3) comprises a clamping tool (6) and a welding head (10). The energy beam (16) of the welding head (10) is directed into the welding gap between the pieces of sheet metal (13, 14). Using the mounting flange (1), the bracket (3) and/or the welding head (10) can be displaced in a linear guide (4), said guide being situated opposite the hydraulic cylinder (7), according to the progression of the weld seam (11). In addition, stop elements (8, 8') for detecting the position of the edges of at least one of the pieces of sheet metal (13, 14) are arranged on the clamping tool (6) in order to position the pieces of sheet metal (13, 14) with regard to one another and/or to the welding head (10).

13 Claims, 4 Drawing Sheets

DEVICE FOR CLAMPING AND WELDING PIECES OF SHEET METAL

FIELD OF THE INVENTION

The present invention pertains to a device for clamping and welding plates which are in contact with one another, preferably for use in automobile manufacturing.

BACKGROUND OF THE INVENTION

It has been known in the manufacture of bodies that both a clamping tool and a laser welding head can be fastened to a robot arm. Various clamping tools are available for welding plates that are in contact with one another. Either the clamping tools are moved together with the laser welding head for welding on the components or the clamping tool is pressed firmly against the components and subsequently released for preparing a weld seam. Preparing a weld seam of a length of, e.g., several cm is problematic in the case of a moving clamping tool because, among other things, displacement may occur between the components.

A device for welding, especially laser welding, with a welding head has been known from EP 0 734 304 B1. The plates are now lying on a support during the processing and are pressed on by means of a spring-tensioned pressing device. The pressing device and the welding head are fastened to the hand of a manipulator and are thus moved corresponding to the course of the weld seam. Sensors, e.g., distance, force or pressure sensors, are additionally arranged at the holding-down device in order to determine whether the holding-down device and the workpiece are in contact with one another or to detect a locally occurring pressure. The welding beam is directed in this prior art toward the upper plate and the contact with the subjacent plates is established by the upper plate. No provisions are made for welding with a welding beam which is directed into the welding gap between the plates that are in contact with one another. This is expediently done with prior-art clamping tools.

Special attention must be paid to the accurate positioning of the plate edges in relation to one another because the plate edges may have unevennesses and damage may occur especially in the case of thin plates.

SUMMARY AND OBJECTS OF THE INVENTION

The basic object of the present invention is therefore to provide a device for clamping and welding in which accurate and lasting clamping and positioning of the plates that are in contact with one another is maintained in relation to one another and to the welding head directed into the welding gap between the plates for preparing an accurate weld seam.

According to the invention, a device for clamping and welding plates is provided for plates that are in contact with one another, preferably for use in automobile manufacture. A bracket is fastened to a mounting flange, preferably of a robot arm. The bracket carries a clamping tool and a welding head. An energy beam of the welding head is directed into the welding gap between the plates. The bracket and/or the welding head is movable in a linear guide by means of the mounting flange in relation to the clamping tool corresponding to the course of the weld seam. Stop elements are arranged on the clamping tool for positioning the plates in relation to one another and/or to the welding head for detecting the position of the edges of at least one of the plates.

A locking device may be provided which prevents a relative movement between the bracket and the clamping tool for positioning the clamping tool at the plates. The locking device may be arranged at the bracket. The locking device may include a pneumatic cylinder.

The clamping tool may be designed as a gripping jaw with a hydraulic cylinder. The stop elements may be arranged on an arm of the gripping jaw, which arm is located opposite the hydraulic cylinder. The edges of the plates located in contact with one another, which edges are to be welded together, may be located in different planes and the stop elements may detect only the position of the edge of the shorter plate. The stop elements may have stop faces arranged at right angles to one another. Two stop elements may be employed, between which the weld seam is formed. These two stop elements may be arranged at spaced locations from one another in the welding direction.

An opening for the energy beam may be provided with a diameter or length that is greater than the maximum length of the weld seam to be prepared. This opening may be arranged in the arm of the clamping tool. The energy beam may be directed onto the contact surface of the edges of the two plates lying one on top of another at an acute angle to the contact surface.

In the device according to the present invention, the clamping tool, preferably a hydraulically actuated gripping jaw, is mounted by means of a bracket on a freely programmable robot. The laser welding head is also fastened to the bracket at the same time. The bracket and/or laser welding heads can be moved by means of the robot arm in a linear guide in relation to the clamping tool corresponding to the course of the weld seam. Due to this additional linear guide according to the present invention and the mobility in relation to one another, it is possible to first bring the entire device, i.e., the bracket and the laser welding head with the clamping tool, to the welding site and to firmly brace the plates to be welded by means of the clamping tool after accurate positioning. Stop elements preferably designed as feelers for detecting the plate edges may be arranged on the clamping tool for positioning the plates. After positioning and clamping the plates, it is possible due to the linear guide to move the bracket and the laser welding head relative to the plates and the gripping jaw and to prepare a weld seam of a length of, e.g., a few cm as a result. The special advantage of this device is that the clamping tool and the plates are not moved during the movement of the laser welding head and remain firmly in their accurate position.

It has proved to be favorable to additionally arrange a locking device on the bracket in order to prevent a relative movement between the bracket and the clamping tool during the positioning of the clamping tool. This locking device may advantageously comprise a pneumatic cylinder, which acts, e.g., in the direction of the linear guide and fixes the clamping tool at one end of the linear guide.

The clamping tool may be designed according to the present invention as a gripping jaw with a hydraulic cylinder, which preferably acts at right angles to the longitudinal direction of the linear guide and braces the plates against an arm of the gripping jaw. The ends of two plates lying one on top of another are thus positioned with their cut edges directly at the stop elements and are then braced by the hydraulic cylinder with the arm of the gripping jaw. However, it is sufficient to grasp only the edge of the shorter plate by means of the stop elements in the case of different heights of the plate edges. The stop elements may be arranged at spaced locations from one another in the welding direction.

The distance is preferably selected to be such that a sufficiently long weld seam of, e.g., several cm, can be prepared between the stop elements.

The laser beam of the laser welding head is directed toward the contact surface at a certain angle, especially an acute angle to the contact surface of the two plates lying one on top of another. To set the incidence angle of the laser beam, a suitable guide is provided for this purpose on the bracket. After clamping the plates in the gripping jaw, the locking cylinder is first switched so as to release the pressure and the linear guide is thus unlocked in order for it to be subsequently able to be moved linearly along the plate edges to be welded together by means of the robot arm of the laser welding head. The servo drive of the robot arm, which is usually present, is used for the movement, so that the laser weld seam is prepared, the preparation of the seam being able to be regulated with a freely selectable velocity profile. As a result, an accurate and uniform welding can be performed in a very short time.

It has proved to be favorable to provide a window-like opening for the laser beam, whose diameter or length is greater than the maximum length of the weld seam to be prepared, in one arm of the gripping jaw. After the conclusion of the welding operation, the hydraulic cylinder of the gripping jaw is released and the robot arm can be displaced to the next welding site. The locking cylinder is again closed during this displacement operation in order to establish an accurate position of the clamping tool in relation to the bracket.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2a is an enlarged detailed view, partially in section, of the area of the stop elements;

DESCRIPTION OF THE PREFERRED EMBODIMENT

Figure 1:
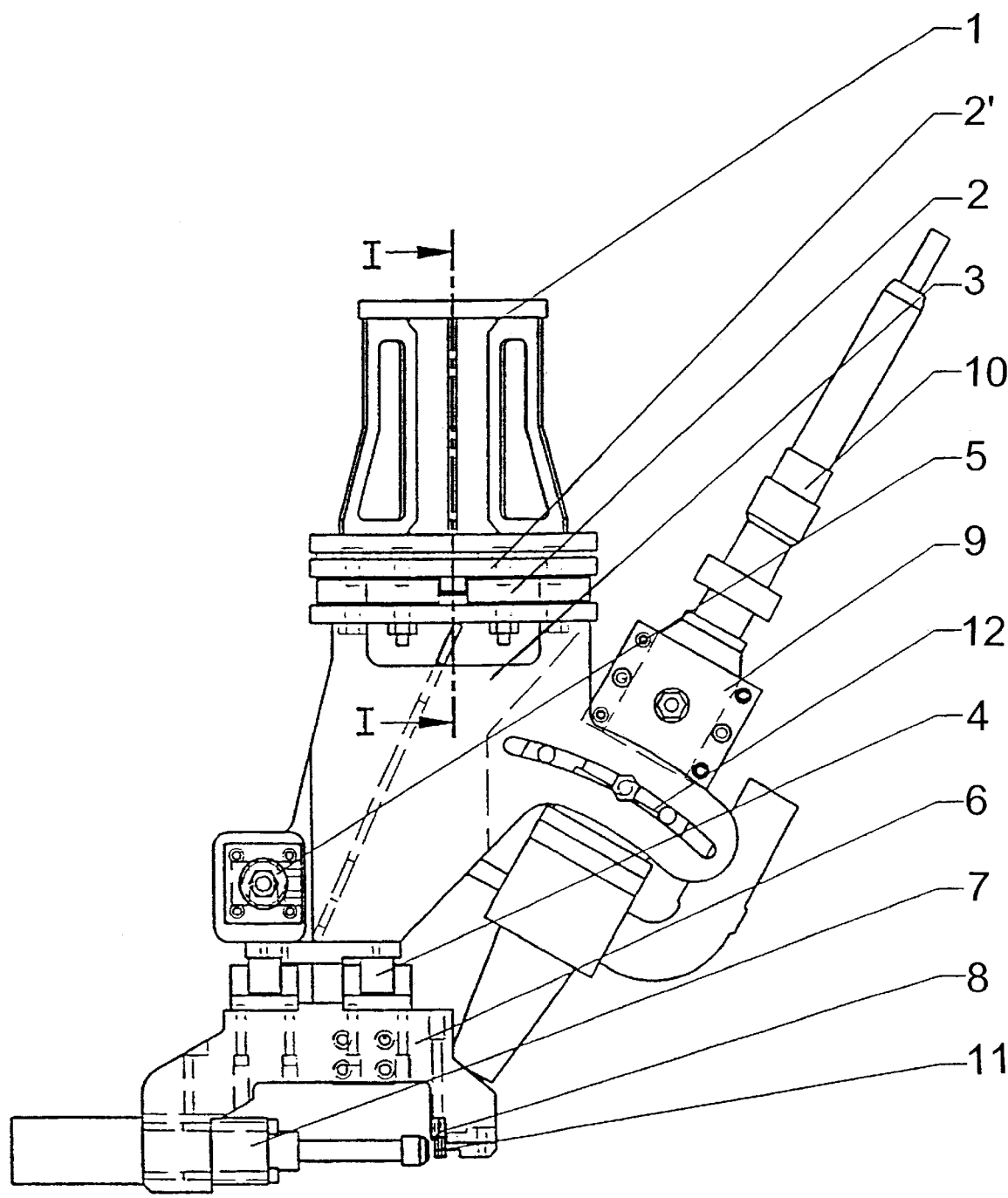
FIG. 1 is a side view of the device according to the present invention.

Referring to the drawings in particular, the device according to the present invention is fastened to a robot arm, not shown, by means of a mounting flange 1. A bracket 3 is fastened to the mounting flange 1 via a vibration compensator 2. The welding head 10 is connected to the bracket 3 via the holder 9. The angle of the energy beam, especially laser beam or electron beam 16, which is directed toward the weld seam 11, is set by means of the guide 12 in the bracket 3. Linear guides 4 to ensure the displaceability of the clamping tool 6 are located on the underside of the bracket 3. Carriages 17 adapted to the linear guides 4 are fastened for this purpose to the clamping tool 6 with fastening screws 18. In addition, a locking device 5 comprising a pneumatic cylinder is located at the bracket 3 in order to lock the clamping tool 6 in a certain position on the bracket 3.

Figure 2:
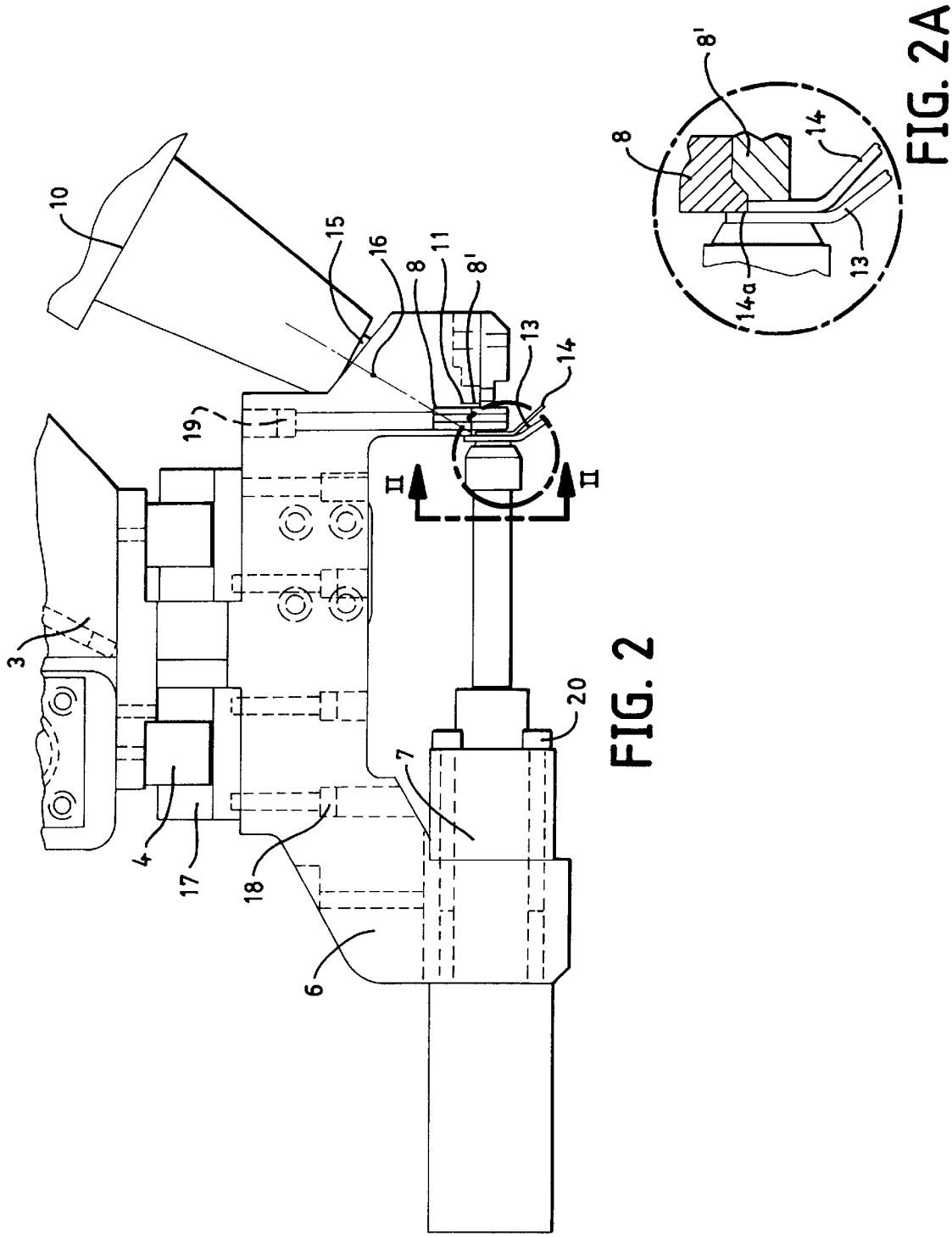
FIG. 2 is an enlarged detailed view of the clamping tool.

FIG. 2 shows the ends of the plates 13 and 14, which ends are to be welded together, in the clamping tool 6. These plates 13, 14 are pressed against the other arm 15 of the clamping tool 6 by means of the hydraulic cylinder 7, which is fastened to one arm of the clamping tool 6 by means of screws 20.

The position of the planes of the two plates 13, 14 is shown more accurately in the enlarged view in FIG. 2a. To ensure that the energy beam 16 is directed exactly into the welding gap between the plates 13 and 14, the top edge 14a of the plate 14 is accurately grasped by means of the stop faces of the stop elements 8 and 8', which said stop faces are arranged at right angles to one another. The top edge of the plate 13 does not need to be grasped so accurately. It is decisive that the arm 15 of the clamping tool 6 be positioned exactly in relation to the top edge 14a and that after actuating the hydraulic cylinder 7, the energy beam 16 produce the weld seam 11 in the welding gap by the linear relative movement.

Figure 3:
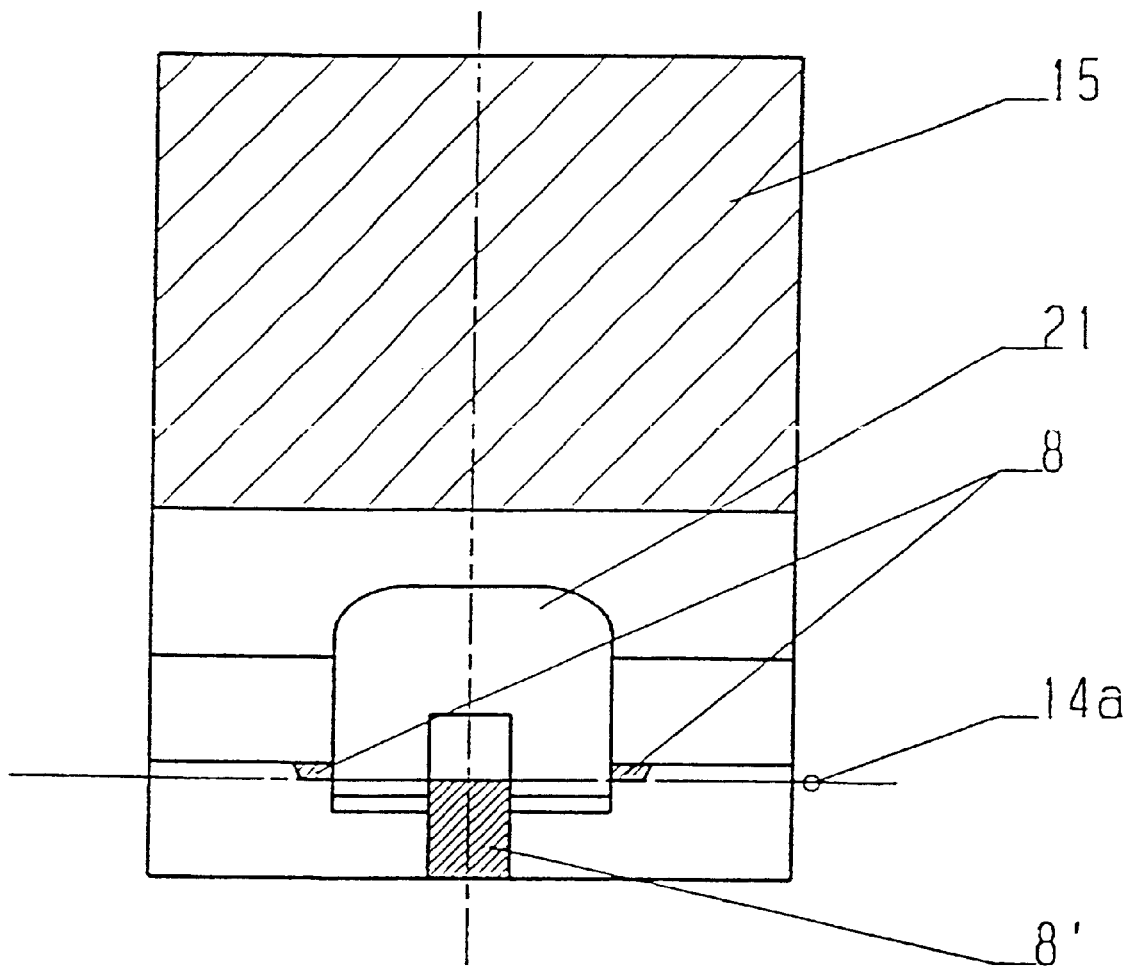
FIG. 3 is a sectional view along line II—II in FIG. 2.

The section in FIG. 3 shows the arrangement of the two stop elements 8 located at spaced locations from one another, which lie with their lower stop faces on the top edge 14a of the plate 14. The stop faces of the stop element 8' lie on the side face of the plate 14 at right angles thereto. The stop elements 8 are connected by fastening screws 19 to the arm 15 of the gripping jaw 6. An opening 21, through which the energy beam 16 of the welding head 10 is directed from the outside onto the welding gap, is located in the arm 15.

Figure 4:
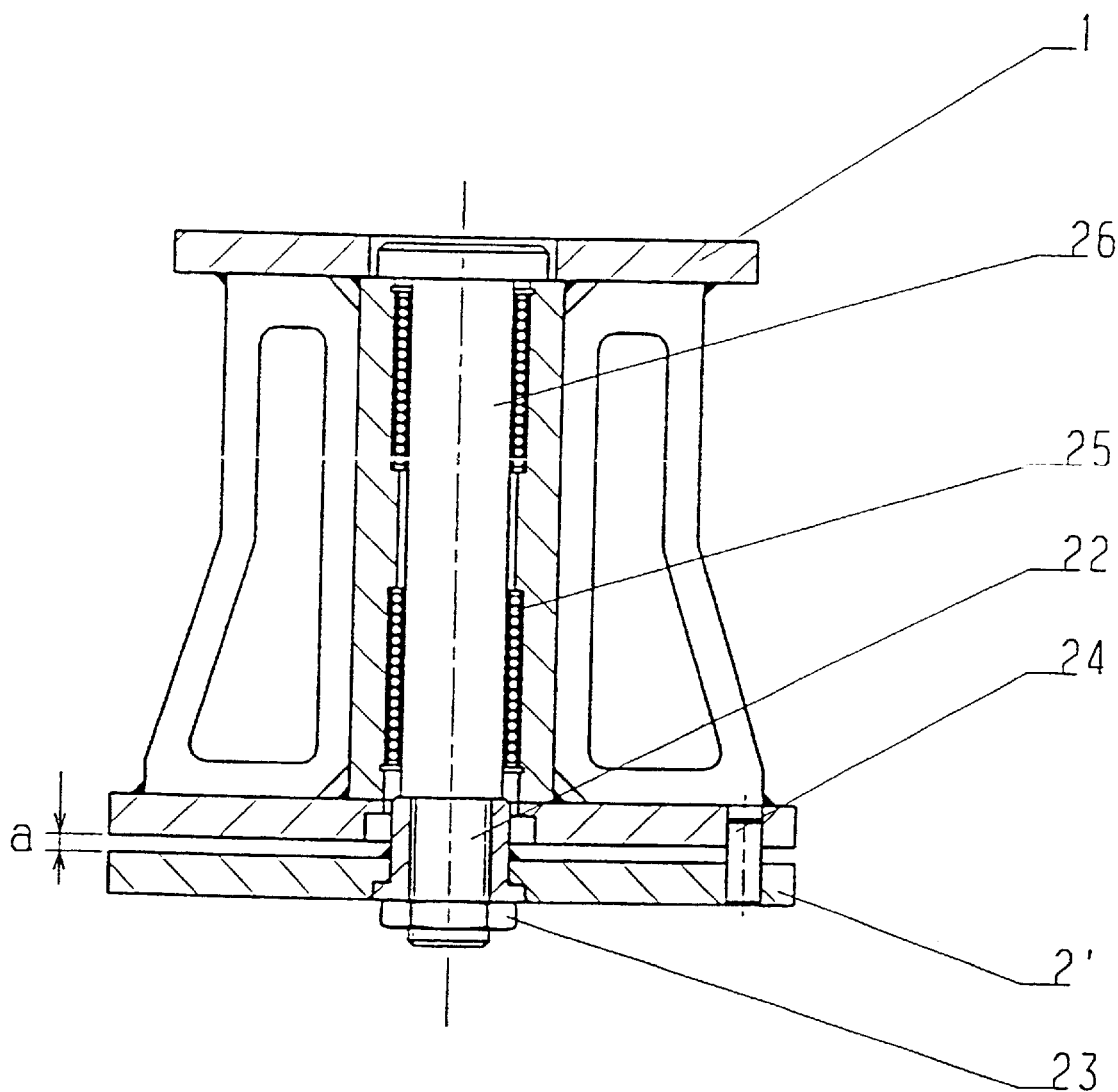
FIG. 4 is a sectional view along line I—I in FIG. 1.

To compensate minor inaccuracies in position at the welding site, a compensating stroke a is provided according to FIG. 4 between the mounting flange 1 and the upper holding plate of the vibration compensator 2. A slight relative movement of the welding head 10 in relation to the fixed robot arm is thus also made possible during the welding operation. The upper holding plate 2' of the vibration compensator 2 is then connected to the mounting flange 1 via the fastening screw 22, the lock nut 23, the guide column 26, the linear bushing 25 and the device for securing against rotation 24.

While a specific embodiment of the invention has been shown and described in detail to illustrate the application of the principles of the invention, it will be understood that the invention may be embodied otherwise without departing from such principles.

What is claimed is:

1. A device for clamping and welding plates that are in contact with one another, the device comprising:

a mounting flange;

a bracket fastened to said mounting flange;

a clamping tool carried by said bracket;

a welding head carried by said bracket, an energy beam of said welding head being directed into a welding gap between the plates;

a linear guide, said bracket and/or said welding head being movable in said linear guide by means of said mounting flange in relation to said clamping tool corresponding to a course of a weld seam; and stop elements arranged on said clamping tool for positioning said plates in relation to one another and/or in relation to said welding head for detecting the position of the edge of at least one of said plates.

2. A device in accordance with claim 1, further comprising:

a locking device to prevent a relative movement between said bracket and said clamping tool for positioning said clamping tool at said plates, said locking device being arranged at said bracket.

3. A device in accordance with claim 2, wherein said locking device includes a pneumatic cylinder.

4. A device in accordance with claim 1, wherein said clamping tool includes a gripping jaw with a hydraulic cylinder.

5. A device in accordance with claim 2, wherein said clamping tool includes a gripping jaw with a hydraulic cylinder.

6. A device in accordance with claim 3, wherein said clamping tool includes a gripping jaw with a hydraulic cylinder.

7. A device in accordance with claim 4, wherein said stop elements are arranged on an arm of said gripping jaw, said arm being located opposite said hydraulic cylinder.

8. A device in accordance with claim 1, wherein the edges of the plates are located in contact with one another, the edges to be welded together being located in different planes and the stop elements detecting only the position of the edge of the shorter plate.

9. A device in accordance with claim 1, wherein the stop elements have stop faces arranged at right angles to one another.

10. A device in accordance with claim 1, wherein two said stop elements are provided between which a weld seam is formed, said two stop elements being arranged at spaced locations from one another in a welding direction.

11. A device in accordance with claim 8, wherein said arm of said clamping tool has an opening for the energy beam, said opening having a diameter or length that is greater than a maximum length of the weld seam to be prepared.

12. A device in accordance with claim 1, wherein the energy beam is directed onto a contact surface of the edges of the two plates lying one on top of another at an acute angle to the contact surface.

13. A device for clamping and welding plates that are in contact with one another for use in automobile manufacture, the device comprising:

a mounting flange;

a bracket fastened to said mounting flange;

a clamping tool carried by said bracket;

a welding head carried by said bracket, an energy beam of said welding head being directed into a welding gap between the plates;

a linear guide, said bracket and/or said welding head being movable in said linear guide by means of said mounting flange in relation to said clamping tool corresponding to a course of a weld seam; and stop elements arranged on said clamping tool for positioning said plates in relation to one another and/or in relation to said welding head for detecting the position of the edge of at least one of said plates.

* * * * *